W. VON TECKLENBURG.
MECHANISM TO LIFT THE DRAGS DURING THE HARROWING OF THE GROUND.
APPLICATION FILED DEC. 23, 1907.
953,769.
Patented Apr. 5, 1910.
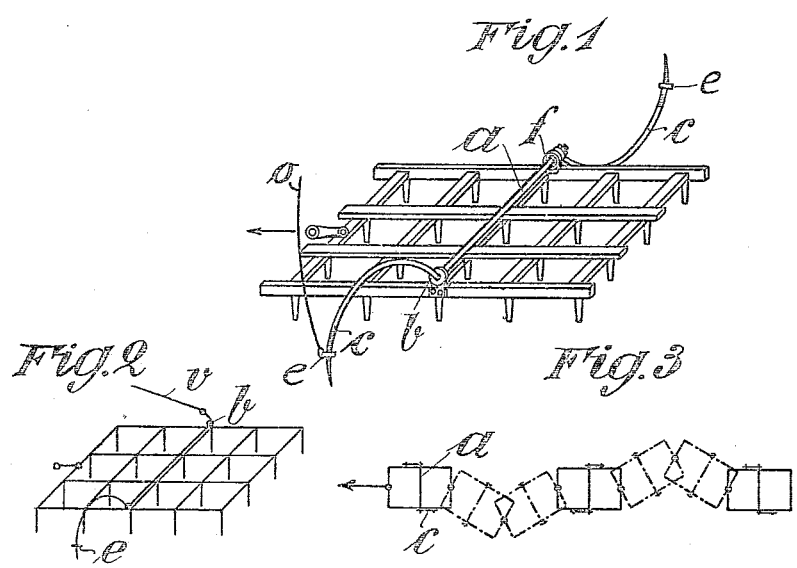
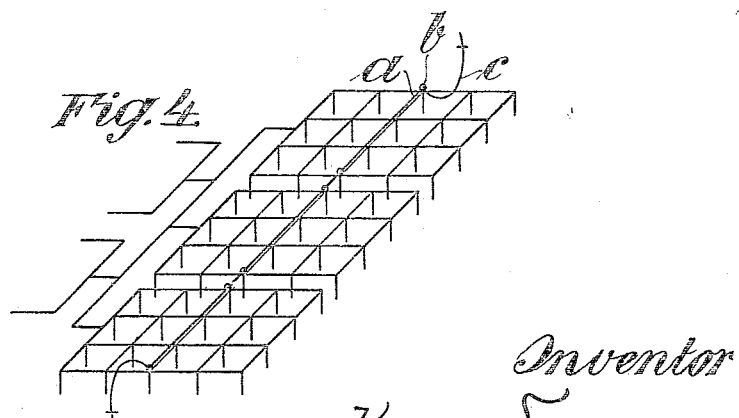
Witnesses
Inventor

UNITED STATES PATENT OFFICE.

WOLDEMAR VON TECKLENBURG, OF HORN, NEAR BREMEN, GERMANY.

MECHANISM TO LIFT THE DRAGS DURING THE HARROWING OF THE GROUND.

953,769. Specification of Letters Patent. Patented Apr. 5, 1910.

Application filed December 23, 1907. Serial No. 407,688.

*To all whom it may concern:*

Be it known that I, WOLDEMAR VON TECKLENBURG, a subject of the German Emperor, and resident of Horn, near Bremen, Germany, have invented certain new and useful Improvements in and Relating to Mechanism to Lift the Drags During the Harrowing of the Ground, of which the following is a specification.

The present invention relates to a mechanism which considerably enlarges the effect of the apparatus described by my previous German patent No. 192737 granted December 18, 1906.

It is a well known fact that during the harrowing of the ground and during the distribution of the seed the drags must be frequently lifted by the harrower in order to attain the desired winding motion of the drags.

The hereafter described mechanism transfers the work of the harrower to the animals pulling the drags, it works completely selfacting and only in exceptional cases the harrower's help is needed.

In the accompanying drawing in which I have illustrated my invention like letters of reference refer to like parts throughout the different views.

In this construction I have shown only one drag but it must be clearly understood that the apparatus can be applied just as well over several drags located next to each other without using more lever legs and this mechanism is also attended by a single manipulation.

In said drawings, Figures 1 and 2 show a drag provided with my improvement. Fig. 3 shows the way which a drag according to Fig. 1 selfactingly passes. Fig. 4 shows the device applied to several drags.

The device consists of a rod $a$ rotatorily mounted in bearings $b$ fixed in any suitable manner to the drag. Connected in any suitable manner to both ends of said rods are lever legs $c$ provided with loops for the fastening of a cord $o$ or the like. The ends of said legs are provided with plates $e$. Instead of the loops I can provide the plates $c$ with a hole. In order to prevent a sideward motion of the shaft $a$ in the bearings I provide either fixed or adjustable rings or flanges $f$ on said places where the shaft touches the bearings.

According to this present improvement the lever legs are mounted on the lever rod (Fig. 1) in an opposite direction. In the state of rest the lever legs balance, while during the motion of the drag I softly pull the rear leg whereafter the one leg showing to the front engages the ground. As the pull of the animals engages the center of the drag a rotation of the same around the mentioned lever leg is effected. Simultaneously a little lifting of the drag is caused. While during the selfacting lowering of the drag the first mentioned leg is turned rearward the other leg is turned forward and by the produced jump driven into the ground whereby the described rotation and lifting of the drag again begins, but the rotation of course in the opposite direction. This causes a continual winding motion. As less lifting is wanted the legs of the lever of distribution harrows are made correspondingly shorter. Another possibility to cause a winding motion is to dispense with or to make shorter the lever leg more distant from the harrower (Fig. 2). In this latter case a throwing over of the leg by means of a cord $v$ becomes necessary.

The lever rods and legs can be manufactured in various ways and forms. The legs may be fixed to the lever rod, either bent, or riveted, or screwed or the like. But they can also be adjustably mounted on the rod especially if the same device is used for cleaning and for distribution drags. In this case the exchanging of one lever leg would be sufficient.

In order to use the lever rod $a$ for one drag as well as for several drags I can make said rod $a$ from pipes telescopingly engaging each other which pipes are moved into each other if one drag is used and are drawn out if several drags are used. The adjusting and arresting of said pipe parts can be effected in any suitable manner. Also the lever legs can consist of such telescoping pipes in order to attain a different lifting of the drag.

What I claim as new and desire to secure by a United States Letters Patent, is:—

In a mechanism to lift the drags during the harrowing of the ground the combination of a drag, a lever shaft, and lever legs arranged in opposite direction from the shaft in position to cause a winding motion of the drag during the lifting up of the same.

In testimony whereof I have hereunto signed my name this 9th day of December 1907, in the presence of two subscribing witnesses.

WOLDEMAR VON TECKLENBURG.

Witnesses:
HANS MEISSNER,
FREDERICK HOYERMANN.